United States Patent
Holzinger

(10) Patent No.: US 11,214,698 B2
(45) Date of Patent: Jan. 4, 2022

(54) RADIATION CURABLE INK

(71) Applicant: TIGER COATINGS GMBH & CO. KG, Wels (AT)

(72) Inventor: Dieter Holzinger, Wels (AT)

(73) Assignee: TIGER COATINGS GMBH & CO. KG, Wels (AT)

(*) Notice: Subject to any disclaimer, the term of this patent is extended or adjusted under 35 U.S.C. 154(b) by 0 days.

(21) Appl. No.: 16/472,271

(22) PCT Filed: Dec. 22, 2017

(86) PCT No.: PCT/EP2017/084289
§ 371 (c)(1),
(2) Date: Jun. 21, 2019

(87) PCT Pub. No.: WO2018/115388
PCT Pub. Date: Jun. 28, 2018

(65) Prior Publication Data
US 2019/0315978 A1  Oct. 17, 2019

(30) Foreign Application Priority Data
Dec. 22, 2016 (EP) .................................... 16206281

(51) Int. Cl.
| C09D 11/101 | (2014.01) |
| C09D 11/033 | (2014.01) |
| C09D 11/107 | (2014.01) |
| C09D 11/38 | (2014.01) |
| B41J 11/00 | (2006.01) |
| B41M 5/00 | (2006.01) |

(52) U.S. Cl.
CPC ......... *C09D 11/101* (2013.01); *B41J 11/0015* (2013.01); *B41M 5/0023* (2013.01); *C09D 11/033* (2013.01); *C09D 11/107* (2013.01); *C09D 11/38* (2013.01)

(58) Field of Classification Search
CPC ... C09D 11/101; C09D 11/033; C09D 11/107; C09D 11/38; B41J 11/0015; B41M 5/0023
See application file for complete search history.

(56) References Cited

U.S. PATENT DOCUMENTS

| 6,114,406 A | 9/2000 | Caiger et al. |
| 2006/0258776 A1* | 11/2006 | Aoai .................... C09D 11/101 523/160 |
| 2009/0031662 A1* | 2/2009 | Chen ................. E04F 15/02172 52/515 |
| 2011/0234689 A1* | 9/2011 | Saito .................... C09D 11/326 347/21 |
| 2017/0198156 A1* | 7/2017 | Lawrence .............. C09D 11/03 |

FOREIGN PATENT DOCUMENTS

| CN | 101532331 A | 9/2009 | |
| EP | 1642943 | 4/2006 | |
| EP | 2053100 | 4/2009 | |
| EP | 2799502 A1 | 5/2014 | |
| EP | 2799502 | 11/2014 | |
| EP | 2799502 A1 * | 11/2014 | ............. C09D 11/30 |
| WO | WO 02/061001 | 8/2002 | |

OTHER PUBLICATIONS

Extended European Search Report issued in Corresponding European Patent Application No. 16206281.4, dated May 26, 2017.
International Search Report and Written Opinion issued in Corresponding International Patent Application No. PCT/EP2017/084289, dated Feb. 26, 2018.
The First Office Action from the National Intellectual Property Administration, PRC issued in corresponding patent Application No. 201780079408.4, dated Jun. 7, 2021.

* cited by examiner

*Primary Examiner* — Matthew Luu
*Assistant Examiner* — Kendrick X Liu
(74) *Attorney, Agent, or Firm* — Norton Rose Fulbright US LLP

(57) ABSTRACT

The present invention relates to a radiation curable ink, wherein the polar portion of the surface tension is equal to or greater than 10%, of the total surface tension, and the total surface tension is between 25 and 31 mN/m, the vapor pressure of the total formulation is equal to or less than 25 mPa at room temperature and the ink includes up to 30% by weight, based on the total ink composition, of unsaturated, hydroxy-functional vinylic and/or methacrylic acid esters.

13 Claims, No Drawings

RADIATION CURABLE INK

CROSS-REFERENCE TO RELATED APPLICATIONS

This application is a national phase application under 35 U.S.C. § 371 of International Application No. PCT/EP2017/084289, filed Dec. 22, 2017, which claims priority to and the benefit of European Patent Application No. 16206281.4, filed Dec. 22, 2016. The contents of the referenced patent applications are incorporated into the present application by reference.

FIELD OF THE DISCLOSURE

This invention relates to radiation curable inks for ink-jet printers, preferably for the design of decorative papers which are used in the production of laminates. In the sense of the present invention, "radiation curable" is understood to be curable by UV, UV-LED or electron radiation.

DESCRIPTION OF RELATED ART

Laminates or molded composite materials generally consist of layers of paper and resin and are brought into their shape and are cured under heat and pressure. Laminate has many positive features: the surface is compact and impact and abrasion resistant. It can be provided with different structures and withstands even high temperatures (e.g. by cigarette ash and hot pot bases) temporarily, without being damaged. The surface is easy to clean and maintain, heat and light resistant and odourless and resistant to alcohol or organic solvents as well as the action of steam and water. Particularly well-known applications for laminates are fronts and worktops of kitchens and floors. Wood, stone and metal imitations and graphic designs give the laminates the right look for these applications. These melamine-pressed surfaces are employed in the sector of furniture, too. Here, the melamine layer may be much lower in thickness due to distinctly less mechanical and chemical requirements.

The production of designed laminates makes use of appropriately designed papers. According to the prior art relevant papers are generally printed by rotogravure and in some cases by inkjet printing. Laminates of any design are available when using the very neutrally coloured melamine-formaldehyde resins, optionally blended with urea-formaldehyde resins, for a subsequent impregnation. The use of phenol-formaldehyde resins is restricted to those applications where the intrinsic colour of these resins does not matter. Next to wet impregnation, dry pressing with melamine overlays is also in use. In order to improve the resin's penetration, melamine underlays are used, too. Nowadays, the most commonly used pressing methods are the CPL (Continuous Pressed Laminates) and the HPL (High Pressure Laminates) processes. Additional methods are known to one skilled in the art and may also be used within the scope of this invention.

Constructing the appropriate printing cylinders is a very complex task and is, thus, economically justifiable only in cases of high quantities of the respective decors.

For prints in small quantities, digital inkjet printing onto various substrates has lately positioned itself in the market. A printhead is directed in accord with an electronic pattern and provides the design following a single-pass or multi-pass of the print substrate.

Radiation curable inks for inkjet printing are well-known. They are advantageous in that the print gets fixed immediately after its application. This is of benefit especially with absorbent substrates such as paper because the applied inks do not penetrate into the undercoat of the substrate or diffuse into each other which makes available prints of greatest possible colour brilliance and sharpness of detail.

Compositions of UV-curable inks are for example disclosed in WO 02/061001 A1. The formulations include at least one multifunctional (meth)acrylate monomer, at least one $\alpha,\beta$-unsaturated ether, at least one photoinitiator and at least one pigment and have a viscosity of less than 100 mPas at 25° C.

U.S. Pat. No. 6,114,406 discloses UV-curable inkjet inks based on polyfunctional alkoxylated and/or polyfunctional polyalkoxylated acrylate monomers, a photoinitiator and a colourant, preferably pigment. Optionally, the formulations may also comprise minor amounts of non-alkoxylated monomers which may optionally be monofunctional. In addition, surfactants, wetting agents and pigment stabilizers may be used optionally. The disclosed compositions are substantially or completely free of solvents and have a low toxicological profile.

However, it has now become apparent that the radiation curable inks available for designing decorative papers are not very suited for the production of laminates. This is due to the fact that such crafted decorative papers are able to take up the resin solutions required for the production of laminates merely very slowly and poorly, if at all. This renders the production of laminates uneconomical, if possible at all, and the laminates themselves deficient.

EP 1642943 A2 relates in general to low viscosity, ink jettable, radiation curable compositions incorporating limited quantities of solvent to provide the compositions with viscosity, wettability, compatibility, and rapid curing advantages. Two randomly chosen inks K and L disclosed in this document will in the experimental part of the subject invention be evaluated regarding its specific properties.

EP 2053100 A2 discloses an inkjet printing method comprising the steps of providing a first radiation curable composition curable by free radical polymerization or cationic polymerization, applying a layer of the first radiation curable composition on a substrate, curing the layer, and jetting on the cured layer a second composition curable by a different polymerization than the first composition but selected from the group consisting of free radical polymerization and cationic polymerization wherein the first composition comprises a cationically polymerizable compound having at least one (meth)acrylate group in an amount of at least 25 wt % based upon the total weight of the first curable composition. Two randomly chosen inks MR1 and MR2 disclosed in this document will in the experimental part of the subject invention be evaluated regarding its specific properties.

EP 2799502 A1 already discloses a radiation curable ink which is well compatible with a melamine resin and can be processed by the laminating and pressing procedures customary today. However, the formulation disclosed has a strong intrinsic odour which renders its use in the sector of furniture impossible due to the very thin layer of melamine. Particularly in pressing but also in its later use the intrinsic odour of the ink is sensorially perceivable which excludes the furniture sector as a possible application field. Ink IJ10 disclosed in this document will in the experimental part of the subject invention be evaluated regarding its specific properties. IJ10 was chosen as comparison as the ink showed good performance during lamination.

Those prints on a decorative paper produced with physically drying inks on a water basis require specific substrate properties of the paper surface which makes a previous coating of the papers necessary and does not achieve the colour brilliance and sharpness of detail as possible with radiation curable inks, as noted before. Coating the papers makes them more expensive, but in front of all, such coatings impose an obstacle, which is hardly to be overcome, to absorbing the resin solutions at the step of impregnating the papers following the print.

However, the aqueous inks show a further weakness: they have a considerable corrosion potential and may damage the sensitive and expensive printheads. Further, they tend to foaming. Foam vesicles interrupt the continuous flow of the ink and result in dropouts in the printed image. As a consequence, aqueous inks can be used solely in the elaborate multi-pass process but not in the single-pass method.

Thus, there is a need for UV-curable inks for inkjet printing in the application field of furniture which overcome the deficiencies of the known UV-curable and aqueous inks mentioned before and, at the same time, are no obstacle to impregnating the printed decorative papers with resin solutions.

DETAILED DESCRIPTION OF THE INVENTION

It was surprisingly found that UV-curable inks for inkjet printing allow for impregnating the decorative papers imprinted with them with a resin solution if the respective ink is produced by using (meth)acrylates and/or vinyl compounds and if the polar portion of the ink's surface tension is equal to or greater than 10% of the total surface tension.

The polar part is that part of the surface free energy of a solid or the surface tension of a liquid which is due to polar interactions. When the polar part and the dispersive part of the surface tension of liquids are known, the surface free energy of a solid can be calculated by measuring the contact angle using different models.

Non-covariant, polar interactions occur in molecules with a dipole moment. These are molecules with a permanent inequality of the electron density due to different electronegativities of the bonding partners while at the same time the molecule is asymmetrical (e.g. water). Molecules with a dipole moment can form polar interactions with one another.

The surface tension σ is based on cohesive interactions within a phase, which, according to Owens, Wendt, Rabel and Kaelble are dispersive (σD) or polar (σP). In each case the sum of the parts makes up the total surface tension.

When there is contact with a second phase, the extent of adhesive interactions (work of adhesion WA) depends on whether similar interactions can be formed with the adjacent phase. This can be seen from the equation according to Owens, Wendt, Rabel und Kaelble.

$$W_A = 2(\sqrt{\sigma_1^D \cdot \sigma_2^D} * \sqrt{\sigma_1^P \cdot \sigma_2^P})$$

In connection with the present invention, the respective measurements of the surface tension of the UV-curable inks were made using a Kruss Tensiometer K100 (KRÜSS GmbH, Hamburg, Germany), in which the total surface tension was measured using a platinum plate and the contact angle was then measured using a teflon plate. Using the above mentioned equation of Owens, Wendt, Rabel und Kaelble, the polar part of the surface tension was calculated.

Thus, the invention relates to a radiation curable ink for inkjet printers for the design of decorative papers which are for the production of laminates, and is characterized in that the polar portion of the surface tension is equal to or greater than 10%, preferably greater than 20%, of the total surface tension, the total surface tension is between 25 and 31 mN/m, the vapor pressure of the total formulation is equal to or less than 25 mPa at room temperature and it includes up to 30% by weight, based on the total ink composition, of unsaturated, hydroxy-functional vinylic and/or methacrylic acid esters.

In connection therewith, the vapor pressure of the total formulation was calculated as the sum of the vapor pressures of the single ingredients at the given temperature. Surprisingly, it was found that in keeping with vapor pressures of equal to or less than 25 mPa at room temperature, the requirements of particularly low-odour inks for the applications according to the invention, together with an increased "open-time" of the printheads were achieved. The odour of an ink is of special importance when used for the design of decorative papers which are later laminated. While one would think that providing a laminate layer over a printed design would deal with an unpleasant and/or disturbing smell of the ink used for printing the design, the actual thickness of a laminate layer over a printed design is so thin (2 to 3 μm in furniture applications and 20 to 30 μm in flooring applications) that the smell or odour of the ink will eventually penetrate through the laminate layer. Also, the inclusion of up to 30% by weight, based on the total ink composition, of unsaturated, hydroxy-functional vinylic and/or (meth)acrylic acid esters, resulted in an enhanced compatibility with a melamine resin used for laminating. It was also surprisingly found that the inks according to the present invention can easily be penetrated by the material used for laminating (especially melamine), without being bound by theory this might be as a result of the high polar portion of the surface tension and the aqueous system used for printing.

It is especially preferred if in the radiation curable ink according to the present invention, the polar portion of the surface tension is equal to or greater than 30%, preferably greater than 35%.

In addition to minimizing the disadvantages described above in accordance with previously used state of the art radiation curable "inkjet" inks for designing the decorative papers used in the production of laminates, the inks of the invention have the advantage of a distinctly reduced sensorial burden compared to the "inkjet" inks used so far which allows for their application in the furniture industrial sector. In contrast to the difficulties occurring at using the known UV-curable inkjet inks, i.e. the appearance of blisters in the boundary layer of ink and laminating resin, such a blister formation is not observed at using the UV-curable inkjet inks according of the invention.

The UV-curable inkjet inks according to this invention preferably include other (polar) acrylate, methacrylate and/or vinyl monomers, particularly preferred in such an amount that the polar portion of the total surface tension is at least 5%, preferably at least 10%, and optionally other common additives and/or pigment stabilizers and adhesion promotors.

In addition, the inks include other acrylate and/or methacrylate monomers and optionally oligomers, pigments and polymeric photoinitiators and synergists. Optionally, they may further contain additives such as pigment stabilizers, plasticizers and adhesion promotors.

The polar agents to be used according to the invention may for example be CAPA or OH-glycol-acrylate. Further, thiol- or amine-functional monomers may be employed.

Preferably, blocked isocyanate curing agents such as aliphatic isocyanates are used in the formulations according to the invention. Particularly preferred are curing agents which are liquid at room temperature. Examples of appropriate curing agents are Desmodur® BL 3175, Desmodur® BL 3370 MPA or Desmodur® BL 3475 BA/SN (all of BAYER) or Vestanat® B 1358 A or Vestanat® B 1370 (EVONIK). The curing agents mentioned are preferably used in an amount of up to 10% by weight, based on the total ink composition.

Referring to the acrylic and methacrylic monomers, mono- to oligofunctional compounds may be employed within the scope of the invention. The variety of available products is very large, and the listing below represents only a part of it.

Examples of monofunctional (meth)acrylic acid esters are: lauryl acrylate, isodecyl acrylate, tridecyl acrylate, tetrahydrofurfuryl acrylate (THFA), 2-(2-ethoxyethoxy) ethyl acrylate (EOEOEA), cyclic trimethylolpropane formal acrylate (CTFA), isobornyl acrylate (IBOA), $C_{12}$-$C_{14}$ alkyl methacrylate, tetrahydrofurfuryl methacrylate (ZHFMA), polypropylene glycol monomethacrylate monomers and isobornyl methacrylate. Examples of the bifunctional (meth) acrylic acid esters to be used are ethoxylated bisphenol A diacrylate, 1,6-hexandiol diacrylate (HDDA), polyethylene glycol 200 diacrylate (PEG200DA), tetraethylene glycol diacrylate (TTEGDA), triethylene glycol diacrylate (TEGDA), propoxylated neopentyl glycol diacrylate, esterdiol diacrylate, tripropylene glycol diacrylate (TPGDA), ethoxylated bisphenol A diacrylate, dipropylene glycol diacrylate (DPGDA), alkoxylated 1,6-hexandiol diacrylate, ethoxylated bisphenol A diacrylate, triethylene glycol dimethacrylate (TIEGDMA), ethylene glycol dimethacrylate (EGDMA), tetraethylene glycol dimethacrylate (TTEGDMA), 1,4-butandiol dimethacrylate (BDDMA), diethylene glycol dimethacrylate (DEGDMA), 1,6-hexandiol dimethacrylate (HDDMA), 1,3-butylene glycol dimethacrylate (BGDMA), ethoxylated bisphenol A dimethacrylate and tricyclodecan dimethanol dimethacrylate. Usable (meth)acrylic acid esters with a functionality of 3 or higher are for example ethoxylated trimethylolpropane triacrylate, pentaerythritol tetraacrylate (PETTA), trimethylolpropane triacrylate (TMPTA), Ditrimethylolpropane tetraacrylate (DiTMPTTA), tris (2-hydroxyethyl) isocyanurate triacrylate, dipentaerythritol pentaacrylate (DiPEPA), dipentaerythritol hexaacrylate (DiPEHA), ethoxylated trimethylolpropane triacrylate, pentaerythritol triacrylate, ethoxylated trimethylolpropane triacrylate, propoxylated trimethylolpropane triacrylate, ethoxylated pentaerythritol tetraacrylate (PPTTA), ethoxylated trimethylolpropane triacrylate and trimethylolpropane trimethacrylate (TMPTMA).

Examples of vinyl components are: N-vinyl pyrrolidone, N-vinyl caprolactam, N-vinyl imidazol, N-vinyl-N-methylacetamide, ethyl vinyl ether, n-butyl vinyl ether, isobutyl vinyl ether, tert-butyl vinyl ether, cyclohexyl vinyl ether, 2-ethylhexyl vinyl ether, dodecyl vinyl ether, octadecyl vinyl ether, 1,4-butandiol divinyl ether, diethylene glycol divinyl ether, triethylene glycol divinyl ether, 1,4-cyclohexane dimethanol divinyl ether, hydroxybutyl vinyl ether, 1,4-cyclohexane dimethanol monovinyl ether, 1,2,4-trivinyl cyclohexane, vinyl phosphorous acid and vinyl phosphorous acid dimethyl ester, and vinyl ethoxyethyl acrylate.

In addition to the monomers listed herein, there are numerous others with a similar construction. They can be found in the product overviews of numerous manufacturers such as Sartomer/Arkema, BASF or Rahn, which are known to those of skill in the art. In the formulations according to the invention, however, monomers with a lowest possible vapor pressure are preferred in order to keep the odour load at pressing them as low as possible.

In addition, polymerizable oligomers can be co-employed, too. These include epoxy acrylates, aliphatic and aromatic urethane acrylates, polyester acrylates and unbranched acrylic oligomers.

In addition to the polar portion of the surface tension and the resulting vapor pressure, the viscosity of the resulting ink has in particular to be taken into account in the selection of the monomers and oligomers and their quantitative ratio in the formulation. The viscosity of the inks according to the invention is—at a processing temperature of usually about 45-50° C.—preferably within a range of 8 to 13 mPa·s, particularly preferred within a range of 9 to 11 mPa·s. It is considered that components with low functionality tend to result in a lower viscosity and components with high functionality tend to result in a higher viscosity of the ink.

In the context of the invention, suitable pigments may be of organic or inorganic nature. Suitable inorganic pigments include for example titanium dioxide and carbon black, while suitable organic pigments include for example the classes of phthalocyanines, anthraquinones, perylenes, carbazoles, monoazo- and bisazo-benzimidazolones, isoindolinones, monoazonaphtholes, quinacridones, diazopyranthrones, pyrazolones and pyranthrones.

Examples of commercially available organic pigments are listed in the Colour Index, Volumes 1 to 8, of the Society of Dyers and Colourists, Yorkshire, England, such as Pigment Blue 1, Pigment Blue 15, Pigment Blue 15:1, Pigment Blue 15:2, Pigment Blue 15:3, Pigment Blue 15:4, Pigment Blue 15:6, Pigment Blue 16, Pigment Blue 24, Pigment Blue 60, Pigment Brown 5, Pigment Brown 23, Pigment Brown 25, Pigment Yellow 3, Pigment Yellow 14, Pigment Yellow 16, Pigment Yellow 17, Pigment Yellow 24, Pigment Yellow 65, Pigment Yellow 73, Pigment Yellow 74 Pigment Yellow 83, Pigment Yellow 95, Pigment Yellow 97, Pigment Yellow 108, Pigment Yellow 109, Pigment Yellow 110, Pigment Yellow 113, Pigment Yellow 128, Pigment Yellow 129, Pigment Yellow 138, Pigment Yellow 139, Pigment Yellow 150, Pigment Yellow 154, Pigment Yellow 156, Pigment Yellow 175, Pigment Green 1, Pigment Green 7, Pigment Green 10, Pigment Green 36, Pigment Orange 5, Pigment Orange 15, Pigment Orange 16, Pigment Orange 31, Pigment Orange 34, Pigment Orange 36, Pigment Orange 43, Pigment Orange 48, Pigment Orange 51, Pigment Orange 60, Pigment Orange 61, Pigment Red 4, Pigment Red 5, Pigment Red 7, Pigment Red 9, Pigment Red 22, Pigment Red 23, Pigment Red 48, Pigment Red 48:2, Pigment Red 49, Pigment Red 112, Pigment Red 122, Pigment Red 123, Pigment Red 149, Pigment Red 166, Pigment Red 168, Pigment Red 170, Pigment Red 177, Pigment Red 179, Pigment Red 190, Pigment Red 202, Pigment Red 206, Pigment Red 207, Pigment Red 224, Pigment Violet 19, Pigment Violet 23, Pigment Violet 32, Pigment Violet 37, Pigment Violet 42, Pigment Black 6 and Pigment Black 7.

The pigments are usually introduced into the formulations through milling into the selected reactive monomers and/or oligomers. Adding dispersing and wetting aids often aids in improving the milling efficiency and stabilizing the pigments de-agglomerated by the milling process. Suitable additives of this kind are available for example under the trade names SOLSPERSE® (The Lubrizol Corporation), EFKA® (Ciba Specialty Chemicals) and BYK (Byk Chemie). The amount of dispersing aid added is determined by the type and amount of the pigment used and amounts to approximately 20 to 100% for organic pigments and to approximately 5 to 80% for inorganic pigments, each based on the amount of the pigment.

If the inks are to be cured by UV-radiation, the formulations must also contain photoinitiators. Particularly preferred photoinitiators include, among others, those of the classes of acylphosphinoxides and acylphosphonates, and useful representatives are, for example, bis(2,4,6-trimethyl-benzoyl)-phenylphosphinoxide, bis-(2,6-dimethoxybenzoyl)-2,4,4-trimethyl-pentylphospinoxide, and further 1-hydroxycyclohexyl phenyl ketone, 2-methyl-1-[4-(methylthio)-phenyl]-2-morpholinopropen-1-one and 2-hydroxy-2-methyl-1-phenylpropan-1-one. These compounds are available, for example, under the trade names Irgacure® (BASF) or Speedcure® (Lambson).

Furthermore, various modifications of alpha-hydroxy ketones, benzophenylene and alpha-amino ketones may be employed.

Co-initiators and amine synergists may be used to improve the curing rate, and examples include isopropyl thioxanthone, ethyl-4-(dimethylamino) benzoate and dimethylaminoethyl methacrylate.

Particularly preferred, use is made use of polymeric versions of the class 1 and 2 photoinitiators and synergists mentioned above. These are supplied, for example, by the companies Rahn, Lambson and BASF.

The preferred quantities to be added are within a range of 1 to 12, particularly preferred within a range of 2 to 8% by weight, based on the total ink composition. The selection of the photoinitiator, too, strongly depends on the type and amount of the pigment employed; advantageously, the pigment(s) and photoinitiator(s) do not absorb at the same wavelength.

Further, thermal stabilizers may find use as additives. These prevent the polymerizable inkjet inks from auto-polymerizing by trapping the radicals which have developed by a thermally initiated decay of the photoinitiators, and thus increase their storage stability.

These products are sold under various trade names, such as Irgafos®, Irganox®, Irgastab®, Chimassorb®, Tinuvin®, Uvinul®, Hycite®, by different commercial suppliers. The preferred quantity of these compounds to be added ranges below 1, preferably below 0.5% by weight, based on the total ink composition.

As a further class of additives, materials with an odour damping effect or odour masking components may be added, such as for example the products of the Protex company under the trade name Masquodour®. The preferred quantity to be added is within a range of 0.0001 to 0.1% by weight, preferably within the range of 0.001 to 0.05% by weight, based on the total ink composition. Surprisingly, it was shown that in particular additives which were developed to mask amines on the basis of limes and/or coumarin and/or limonene and/or pines and/or vanillin may be used for this application.

According to a preferred embodiment of the present invention, the ink includes 1 to 20% by weight, based on the total ink composition, of unsaturated, polymerizable and condensable melamine acrylates and/or melamine methacrylates. Without being bound by theory, this presumably results in a chemical binding to the ink matrix of the melamine resin used for laminating. Higher quantities show a disadvantageous effect on the printing process due to exaggerated viscosities.

To achieve an enhanced compatibility with the melamine resin, the ink according to the invention is preferred to include up to 10% by weight, based on the total ink composition, of polyfunctional alcohols such as glycerol. Too high amounts of glycerol show a disadvantageous effect on the polymerisation rate.

The formulations of the invention are prepared by contacting the respective components, by mixing, stirring, grinding and other methods, which are suited to yield homogenous compositions.

The final formulations may subsequently be applied via inkjet printer not only in multi-pass but especially in the single-pass method and then cross-linked by UV or electron radiation.

According to a preferred embodiment of the present invention, such inks are used in the manufacturing of laminates, wherein the ink is used for printing a design on a suitable support, which design is then laminated with a cover layer, which cover layer preferably is a melamine layer. Especially preferred is the use of such inks in the manufacturing of laminates used in the furniture industry, where the thickness of the melamine laminate over the printed design is below 10 μm, preferably below 5 μm.

Furthermore, the inks of the present invention can also be used in the manufacturing of laminates used in the flooring industry, where the thickness of the melamine laminate over the printed design is above 20 μm.

The invention is further illustrated by the following examples, without reducing it to the scope of the examples. To someone skilled in the art it is easy to modify the examples within the scope of the invention and to adjust them to specific requirements. The employed mill-base was composed of the following ingredients: 25% pigment (for example Pigment Blue 15:3), 10% Tegodisperse 685.65% CTFA. Tegodisperse 685 is a dispersing additive sold by the Tego company. CTFA is short for cyclic trimethylol formal acrylate. The milling of the base was carried with a ball mill until the desired particle diameter was reached.

In the following tables 1 and 2, the ink components are listed on the left from top to bottom and the individual experimental batches are given in the header. The quantities are given in % by weight. The measured polar portions of the surface tension correspond directly to the polarity of the monomers used.

TABLE 1

|  | V | IJ1A | IJ2A | IJ3A | IJ4A | IJ5A | IJ6A | IJ7A | IJ8A | IJ9A | IJ10A | IJ11A |
| --- | --- | --- | --- | --- | --- | --- | --- | --- | --- | --- | --- | --- |
| POEA* | 58.7 | 55.7 | 29.2 | 20 | 10 | 0 | 0 | 0 | 0 | 0 | 0 | 0 |
| PONPGDA* | 5 | 5 | 5 | 0 | 0 | 0 | 0 | 0 | 0 | 0 | 0 | 0 |
| Esacure KIP 160 (Lamberti) | 3 | 3 | 3 | 0.45 | 0 | 0.45 | 0 | 0.45 | 0 | 0 | 0 | 0 |
| Omnirad 380 (IGM Resins) | 3 | 3 | 3 | 1.5 | 0 | 1.5 | 0 | 1.5 | 0 | 0 | 0 | 0 |
| TDA* | 0 | 0 | 0 | 23 | 34.93 | 43 | 24.93 | 38 | 24.93 | 24.88 | 24.88 | 24.88 |
| NVC (BASF) | 20 | 20 | 20 | 0 | 0 | 0 | 0 | 0 | 0 | 0 | 0 | 0 |
| CN386* | 0 | 0 | 0 | 2 | 5 | 2 | 5 | 2 | 5 | 5 | 6 | 5 |
| NPAL (Wako) | 0.3 | 0.3 | 0.3 | 0 | 0 | 0 | 0 | 0 | 0 | 0 | 0 | 0 |

TABLE 1-continued

| | V | IJ1A | IJ2A | IJ3A | IJ4A | IJ5A | IJ6A | IJ7A | IJ8A | IJ9A | IJ10A | IJ11A |
|---|---|---|---|---|---|---|---|---|---|---|---|---|
| Mill-base (TIGER Coatings) | 10 | 10 | 10 | 8 | 8 | 8 | 8 | 8 | 8 | 8 | 8 | 8 |
| Speedcure 7010 (Lambson Ltd.) | 0 | 0 | 0 | 2.5 | 4 | 2.5 | 4 | 2.5 | 4 | 4 | 3 | 4 |
| Bomar BMA 200 (IGM Resins) | 0 | 3 | 5 | 0 | 0 | 0 | 0 | 5 | 5 | 0.5 | 0 | 0 |
| MPDA* | 0 | 0 | 0 | 8 | 16 | 8 | 16 | 8 | 16 | 15.5 | 16 | 16 |
| Speedcure 7005 (Lambson Ltd.) | 0 | 0 | 0 | 2.5 | 4 | 2.5 | 4 | 2.5 | 4 | 4 | 4 | 4 |
| BDMA* | 0 | 0 | 20.5 | 0 | 0 | 0 | 0 | 0 | 0 | 0 | 0 | 0 |
| Desmodur ® BL 3175 | 0 | 0 | 3 | 0 | 0 | 0 | 0 | 3 | 0 | 0 | 0 | 0 |
| CAPA* | 0 | 0 | 0 | 0 | 18 | 0 | 38 | 0 | 31 | 38 | 38 | 38 |
| Glycerol | 0 | 0 | 1 | 0 | 0 | 0 | 0 | 0 | 2 | 0 | 0 | 0 |
| Bisomer PEA6 (Geo Speciality Chemicals) | 0 | 0 | 0 | 32 | 0 | 32 | 0 | 29 | 0 | 0 | 0 | 0 |
| Masquodour FGR (Protex Chimie SA) | 0 | 0 | 0 | 0.05 | 0.05 | 0.05 | 0.05 | 0.05 | 0.05 | 0.05 | 0.05 | 0.1 |
| Sum | 100 | 100 | 100 | 100 | 100 | 100 | 100 | 100 | 100 | 100 | 100 | 100 |
| Polar portion of the surface tension % | 0 | 4 | 4 | 7 | 8 | 15 | 12 | 17 | 18 | 25 | 30 | 35 |
| Vapor pressure [mPa] | 220 | 210 | 160 | 110 | 90 | 14 | 20 | 18 | 25 | 20 | 18 | 14 |

*Manufacturer Arkema/Sartomer

The raw materials listed in table 1 were mixed; the numbers mean parts by weight.

After imprinting the papers with the respective formulations, specimens were cut out of them and were contacted on the side provided with the inkjet ink with an aqueous melamine resin solution.

In the subsequent laminating process printed layers with overlay or printed and impregnated layers without overlay were pressed in the CPL process by short-cycle or double belt presses (200° C., 40 bar, 12 seconds) or in the HPL process by a platen press (125° C., 75 bar, 100 minutes).

In the following table 2 the various test results are shown, wherein the pressing results by short-cycle or double belt presses and a platen press are depicted. In addition, the results of the cross-cutting, boiling and odour tests are shown.

TABLE 2

| | Short-cycle and double belt presses | | | Platen presses | | | |
|---|---|---|---|---|---|---|---|
| Designation | Blistering | Cross-cutting test | Boiling test | Blistering | Cross-cutting test | Boiling test | Odour test |
| V | Yes | np | np | Yes | np | np | 12 |
| IJ1A | Yes | Gt 3 | − | Yes | Gt 3 | − | 12 |
| IJ2A | No | Gt 1 | + | No | Gt 1 | + | 12 |
| IJ3A | No | Gt 0 | ++ | No | Gt 1 | + | 9 |
| IJ4A | No | Gt 1 | + | No | Gt 0 | ++ | 10 |
| IJ5A | No | Gt 0 | +++ | No | Gt 0 | +++ | 3 |
| IJ6A | No | Gt 0 | +++ | No | Gt 0 | +++ | 4 |
| IJ7A | No | Gt 0 | +++ | No | Gt 0 | +++ | 4 |
| IJ8A | No | Gt 0 | +++ | No | Gt 0 | +++ | 5 |
| IJ9A | No | Gt 0 | +++ | No | Gt 0 | +++ | 5 |
| IJ10A | No | Gt 0 | +++ | No | Gt 0 | +++ | 4 |
| IJ11A | No | Gt 0 | +++ | No | Gt 0 | +++ | 1 |

Legend:
Blistering: yes/no
Cross-cutting test (EN ISO 2409): Gt 5 (complete detachment)-Gt 0 (complete adhesion)
Boiling test taken from EN12721: − (Blistering, delamination); + to +++ (reduced to no blistering and delamination with increasing quality from + to +++)
Odour test was performed following wet impregnation and pressing without overlay. 4 persons each assess the pressed specimens by means of the scale 0 (no odour) to 3 (very strong odour), whereby the points are added.
np: not performed During the pressing process, the printed layers with the inventive formulations (IJ5A to IJ11A) showed complete laminatability without blistering in the CPL process by means of short-cycle presses or double belt presses (200° C., 40 bar, 12 seconds) or in the HPL process by means of platen presses (125° C., 75 bar, 100 minutes). In the performed cross-cutting, boiling and odour tests, different results were obtained depending on the formulations employed.

The inventive formulations IJ5A to IJ11A showed, at an optimal selection of the raw materials, neither detachment at cross-cutting nor blistering or delaminating in the boiling test. Further, the lowest odour loads were determined in the odour test with a maximum of 5. Especially regarding examples IJ7A to IJ11A, the reliability of the process can be enhanced and the process time stated above can be reduced by 10% by further increasing the polar portion of the surface tension up to 35%.

The disclosed compositions of formulations IJ3A and IJ4A, in which the polar portion of the surface tension, 7% and 8%, respectively, is lower than the value of 10% as required by the present invention and showed worse results in the cross-cutting test and in the boiling test than those of the inventive range. The defects shown in the tests and the slightly higher odour load Will not permit their application in the field of furniture production.

The non-inventive comparative examples V, IJ1A and IJ2A have a polar portion of the surface tension below the one provided for by the invention which caused blistering as early as in laminating, and in the subsequently performed tests, no composite strength of the layer structure could be observed. The compositions were not usable.

The same holds true for inks as disclosed in the documents of the state-of-the-art which were mentioned in the introduction of the present invention. Ink K and ink L EP 1642943 A2, ink MR1 and MR2 as disclosed in EP 2053100 A1 as well as ink IJ10 as disclosed in EP 2799502 A1 were tested and compared to an ink according to the present invention, namely IJ11A While it was not possible to laminate inks K, L, MR1 and MR2, ink IJ10 could be laminated but failed for furniture applications due to its intensive smell.

TABLE 3

| Tinte | Surface tension [mN/m] | Contact angle [°] | polar [mN/m] | dispers [mN/m] | Polar portion [%] | Odour |
|---|---|---|---|---|---|---|
| Ink K | 33.594 | 61.15 | 6.633 | 26.961 | 19.745 | 12 |
| Ink L | 27.932 | 56.05 | 7.334 | 20.597 | 26.257 | 11 |
| MR1 | 27.48 | 58.37 | 8.405 | 19.074 | 30.586 | 6 |
| MR2 | 24.086 | 46.09 | 6 | 18.085 | 24.911 | 5 |
| IJ10 from EP 2799502 A1 | 25.8 | 55.22 | 7.956 | 17.843 | 30.837 | 8 |
| IJ11A | 26.963 | 61.42 | 9.691 | 17.271 | 35.942 | 1 |

The invention claimed is:

1. A radiation curable low odor ink free of N-vinylcaprolactam, comprising up to 38% by weight, based on the total ink composition, of unsaturated, hydroxy-functional vinylic esters, and/or acrylic acid esters, and/or (meth)acrylic acid esters, wherein the unsaturated, hydroxy-functional vinylic and/or (meth)acrylic acid esters are (poly)caprolactone acrylate (CAPA) and/or polyethyleneglycol (6) acrylate (Bisomer PEA6), the polar portion of the surface tension is equal to or greater than 10% of the total surface tension, and the total surface tension is between 25 and 31 mN/m.

2. The ink of claim 1, wherein the polar portion of the surface tension is equal to or greater than 30%.

3. The ink of claim 1 further comprising one or more additional components selected from the group consisting of acrylate, methacrylate monomers, vinyl monomers, oligomers, pigments, photoinitiators, customary additives pigment stabilizers, and adhesion promoters.

4. The ink of claim 1, wherein the ink further comprises polymeric photoinitiators and synergists.

5. The ink of claim 4, further comprising blocked isocyanates and up to 10% by weight, based on the total ink composition, of blocked isocyanate curing agents.

6. The ink of claim 1, further comprising one or more odor-masking components selected from the group consisting of limes, coumarin, limonene, pines, vanillin, or combinations thereof.

7. The ink of claim 1, further comprising from 1 to 20% by weight, based on the total ink composition, of unsaturated, polymerizable and condensable melamine acrylates and/or melamine methacrylates.

8. The ink of claim 1 further comprising up to 10% by weight, based on the total ink composition, of polyfunctional alcohols.

9. A method of using the ink of claim 1 in the manufacturing of laminates, the method comprising using the ink to print a design on a suitable support, and laminating the printed design with a cover layer.

10. The method of claim 9, wherein the cover layer is a melamine layer.

11. The method of claim 10, wherein the thickness of the melamine layer over the printed design is less than 10 μm.

12. The method of claim 10, wherein the thickness of the melamine layer over the printed design is greater than 20 μm.

13. The ink of claim 1, wherein the ink exhibits a maximum score of 5 for summed results of four individual odor tests, wherein the odor test is assessed on a scale of 0 (no odor) to 3 (very strong odor), and wherein the odor test is performed following wet impregnation and pressing without overlay.

* * * * *